United States Patent Office.

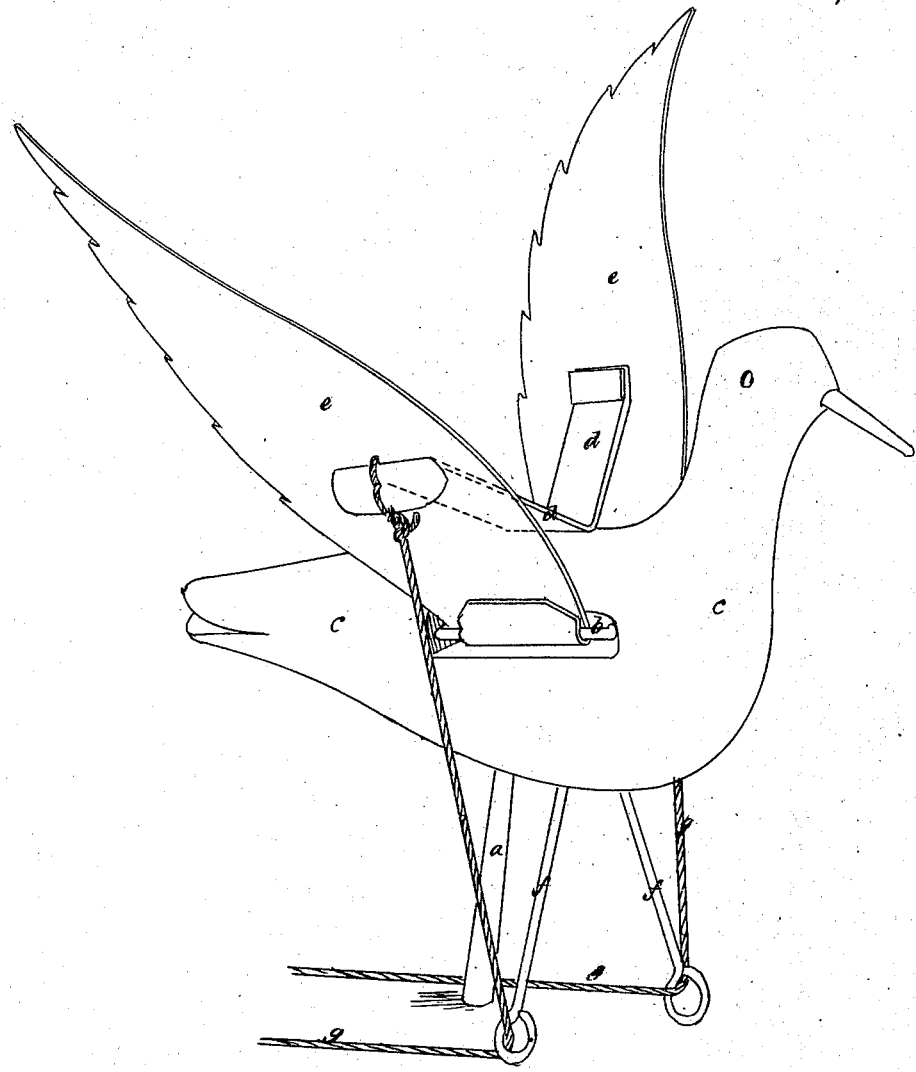

NATHANIEL WALES, OF BOSTON, MASSACHUSETTS.

Letters Patent No. 74,458, dated February 11, 1868.

IMPROVEMENT IN DECOY-BIRDS.

*The Schedule referred to in these Letters Patent and making part of the same.*

TO ALL WHOM IT MAY CONCERN:

Be it known that I, NATHANIEL WALES, of Boston, in the county of Suffolk, and State of Massachusetts, have invented an Improvement in Decoy-Birds; and I do hereby declare that the following, taken in connection with the drawings which accompany and form part of this specification, is a description of my invention sufficient to enable those skilled in the art to practise it.

The decoys usually employed have heretofore been each carved of a block of wood, or have been rudely stuffed skins of birds, and, in some rare instances, wings have been hinged to decoys, so as to receive motion from the wind, much in the manner of a well-known toy, the whole body of the decoy being suspended, and receiving motion from the wind, which also occasioned a motion of the wings relative to the body. It will therefore be understood that I make no claim to hinging wings to the body of an imitation of a bird in such a way as to permit or to cause motion of the wings, this having long been done, as, for example, in mechanical birds, which have been made not only to fly, but even to sing.

My invention is designed to supply cheaply, to gunners, a means for causing, at will, a motion of the wings of a decoy, to attract the attention of flying birds; and it consists in the combination, with the body of a decoy, of wings which are made to move by a line or lines leading from the body of the decoy to the gunner, so that he can, at will, by pulling on the string or strings, cause a movement of the wings, which will attract the attention of flying birds.

The drawing shows a decoy, mounted, as is usual, on a peg, $a$, thrust into the ground. Each wing is pivoted, as seen at $b$, to the body $c$, and a spring, $d$, which is preferably of rubber, or of rubber woven in cloth, is secured to each wing, $e$, and to the body $c$. Leaders $f$ are fixed in the body, and a string is fastened to each wing. Said strings, $g$, being passed through the leaders, are united, at a short distance from the body of the bird, to one leading where it can be operated by the gunner or his assistant.

It will be seen that, by a pull on the strings $g$, the wings will be moved downward, extending spring $d$, which, on slackening the springs, will, by its contraction, raise the wings, so that the gunner, by manipulation, can produce a movement of the wings like those of a bird that is hovering before alighting, or like the movement which some birds make in running.

To facilitate packing, I sometimes insert removable plugs in the body, to which plugs the wings are hinged, the plugs being held in the body by a removable screw or pin, so that they and the wings can be removed from the body and packed in small compass; or, a cylindrical plug can pass crosswise through the body, to which plug the wings can be hinged, and then a twist of the plug of about ninety degrees will allow the wings to be folded lengthwise down upon the body, so that the decoy will occupy but little space in packing.

I have shown the most simple arrangement known to me for producing movement of the wings at the will of the gunner, the means shown being such as are easily and cheaply procured, and replaced, if injured by shot. Other and more complicated means for producing movement of the wings, by the pull of a string by the gunner, are known to me, and still others may be devised, but so long as the movement is produced by the gunner (or his assistant) by his manipulation of a string, the changes are merely formal, and embody the spirit of my invention.

I claim a decoy, having wings hinged thereto, arranged to be operated by manipulation of a sportsman, substantially as and for the purpose described.

NATHANIEL WALES.

Witnesses:
J. B. CROSBY,
FRANCIS GOULD.